United States Patent
Sobey

(10) Patent No.: US 12,555,596 B2
(45) Date of Patent: Feb. 17, 2026

(54) HIGH-FIDELITY, LOW-CONTACT DATA RETRIEVAL FROM LEGACY TAPES

(71) Applicant: ChannelScience, LLC, Plano, TX (US)

(72) Inventor: Charles Sobey, Plano, TX (US)

(73) Assignee: ChannelScience, LLC, Plano, TX (US)

( * ) Notice: Subject to any disclaimer, the term of this patent is extended or adjusted under 35 U.S.C. 154(b) by 0 days.

(21) Appl. No.: 18/812,449

(22) Filed: Aug. 22, 2024

(65) Prior Publication Data

US 2025/0054513 A1  Feb. 13, 2025

Related U.S. Application Data

(63) Continuation of application No. 18/366,592, filed on Aug. 7, 2023, now Pat. No. 12,106,788.

(51) Int. Cl.
*G11B 5/48* (2006.01)
*G11B 5/78* (2006.01)
*G11B 5/40* (2006.01)

(52) U.S. Cl.
CPC ............. *G11B 5/4893* (2013.01); *G11B 5/78* (2013.01); *G11B 5/40* (2013.01)

(58) Field of Classification Search
None
See application file for complete search history.

(56) References Cited

U.S. PATENT DOCUMENTS

| | | | |
|---|---|---|---|
| 7,428,120 B2* | 9/2008 | Berman | G11B 5/584 |
| 10,789,981 B2* | 9/2020 | Musha | G11B 20/10055 |
| 12,106,788 B1* | 10/2024 | Sobey | G11B 5/78 |
| 12,374,355 B2* | 7/2025 | Sobey | G11B 20/10009 |
| 2013/0258519 A1* | 10/2013 | Poorman | G11B 5/00813 |
| | | | 360/110 |
| 2018/0070048 A1* | 3/2018 | Araki | G11B 27/034 |
| 2019/0189155 A1* | 6/2019 | Yamamoto | G11B 27/30 |
| 2022/0316656 A1* | 10/2022 | Burks | F17C 13/02 |

* cited by examiner

*Primary Examiner* — William J Klimowicz
(74) *Attorney, Agent, or Firm* — Scale LLP

(57) ABSTRACT

Systems and methods are disclosed for retrieving information from legacy storage media with high fidelity and minimal contact. A read sensor with multiple read elements detects electromagnetic fields from tracks on a storage medium. Readings from different elements are combined to generate a composite interpretation, which can be used to, for example, generate digitized waveforms and determine if portions of tracks are damaged.

20 Claims, 7 Drawing Sheets

HIGH-FIDELITY, LOW-CONTACT DATA RETRIEVAL FROM LEGACY TAPES

CROSS-REFERENCE TO RELATED APPLICATIONS

This application is a continuation of U.S. application Ser. No. 18/366,592, filed Aug. 7, 2023, entitled "High-Fidelity, Low-Contact Data Retrieval from Legacy Tapes", the contents of which are fully incorporated herein by reference.

This invention was made with government support under DE-SC0021879 awarded by the U.S. Department of Energy. The government has certain rights in the invention.

TECHNICAL FIELD

Various aspects of the present disclosure relate generally to systems and methods for retrieving information from tapes. In particular, aspects of the present disclosure relate to retrieving information from legacy tapes at high accuracy and with minimal or no contact to the tape surface.

BACKGROUND

Vintage magnetic tapes, such as 9-track magnetic tapes, often contain valuable data. For example, legacy tapes may contain seismic data, petroleum exploration, earthquakes, climate data, satellite telemetry, voice, music, and many other types of data that, if retrieved, could be used for new applications, including training machine learning models. These tapes are often fragile, deteriorating, and costly to read. Due to deterioration in the tapes, recovering data may be difficult. And, due to their fragility, attempting recovery by contacting the tape using standard magnetic sensors may damage the tape, permanently preventing recovery.

The present disclosure is directed to overcoming one or more of these above-referenced challenges.

SUMMARY

According to certain aspects of the disclosure, systems, methods, and computer readable memory are disclosed for retrieving information from tapes. In particular, aspects of the present disclosure relate to retrieving information from legacy tapes at high accuracy and with minimal or no contact to the tape surface.

A system may include one or more read sensors. The read sensor(s) may include a plurality of read elements configured to detect electromagnetic fields produced by one or more tracks of a storage medium. The plurality of read elements may include a first group of read elements and a second group of read elements. The electromagnetic fields may indicate information stored on the storage medium. In some embodiments, the read sensor(s) may be configured such that the first group of read elements and the second group of read elements can simultaneously read the first and second sets of data from the first and second tracks, respectively, without contacting the storage medium or while applied a contact force to the storage medium that is less than a contact force value, such as 100 mN.

The first group of read elements may be positioned adjacent to the first track and the second group of read element may be adjacent to the second track. In some embodiments, the system may include a second read sensor. The second read sensor may include at least two groups of read elements respectively positioned adjacent to third and fourth tracks of the storage medium. The first read sensor and the second read sensor may be positionally staggered to read data from the storage medium at different positions along the length of the storage medium. The plurality of read elements may be disposed on an LTO (Linear Tape Open) tape head. The LTO tape head may be retrofitted to a tape reader. For example, a user may have an existing tape reader (which may, in some cases, have been used for many years). To improve the performance of the existing tape reader and reduce damage to tapes, a tape head with multiple read elements per track may be retrofitted to the existing tape reader, and software having the functionalities described herein may be installed to extract data and/or create magnetic images with higher accuracy and less damage to recording media.

Multiple readings of the electromagnetic fields generated by the first track may be collected using multiple read elements of the first group. In some embodiments, multiple readings of the electromagnetic fields generated by the first track may be collected using multiple read elements of the second group.

A composite interpretation of a set of data encoded on the first track may be generated based on the multiple readings of the electromagnetic fields generated by the first track that are collected by the multiple read elements of the first group. In some embodiments, a composite interpretation of a set of data encoded on the first track may be generated based on the multiple readings of the electromagnetic fields generated by the first track that are collected by the multiple read elements of the second group. The composite interpretation of the first set of data of the first track may be generated by combining the first reading of the electromagnetic fields from the first track and the second reading of the electromagnetic fields from the first track. Combining the first reading of the electromagnetic fields from the first track and the second reading of the electromagnetic fields from the first track may include one or more of the following: oversampling a first set of waveforms associated with the first reading of the electromagnetic fields from the first track and a second set of waveforms associated with the second reading of the electromagnetic fields from the first track, synchronizing the first set of waveforms and the second set of waveforms, or applying at least one of summing, amplitude modulating, averaging, or multiplexing.

In some embodiments, the first reading of the electromagnetic fields from the first track may be aligned, using a first synchronization mark, with the second reading of the electromagnetic fields from the first track. Aligning the first reading of the electromagnetic fields from the first track with the second reading of the electromagnetic fields from the first track may include matching a timestamp associated with the first reading of the electromagnetic fields from the first track with a timestamp associated with second reading of the electromagnetic fields from the second track. Aligning the first reading of the electromagnetic fields from the first track with the second reading of the electromagnetic fields from the first track may include cross-correlating signals associated with the first reading of the electromagnetic fields from the first track with signals associated with the second reading of the electromagnetic fields from the first track.

In some embodiments, the composite interpretation of the first set of data of the first track may be generated by averaging the first reading of the electromagnetic fields from the first track and the second reading of the electromagnetic fields from the first track. Averaging the first reading of the electromagnetic fields from the first track and the second reading of the electromagnetic fields from the first track may improve a signal-to-noise ratio (SNR) of the composite interpretation at least in part by diminishing uncorrelated noise.

In some embodiments, a skew may be determined between the first group of read elements and the first track. Using the determined skew, the first reading of the first track may be aligned with the second reading on the first track.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description serve to explain the principles of the disclosed technology.

DETAILED DESCRIPTION

In general, the present disclosure is directed to methods and systems for retrieving information from tapes. In particular, aspects of the present disclosure relate to retrieving information from legacy tapes at high accuracy and with minimal or no contact to the tape surface.

Figure 1:
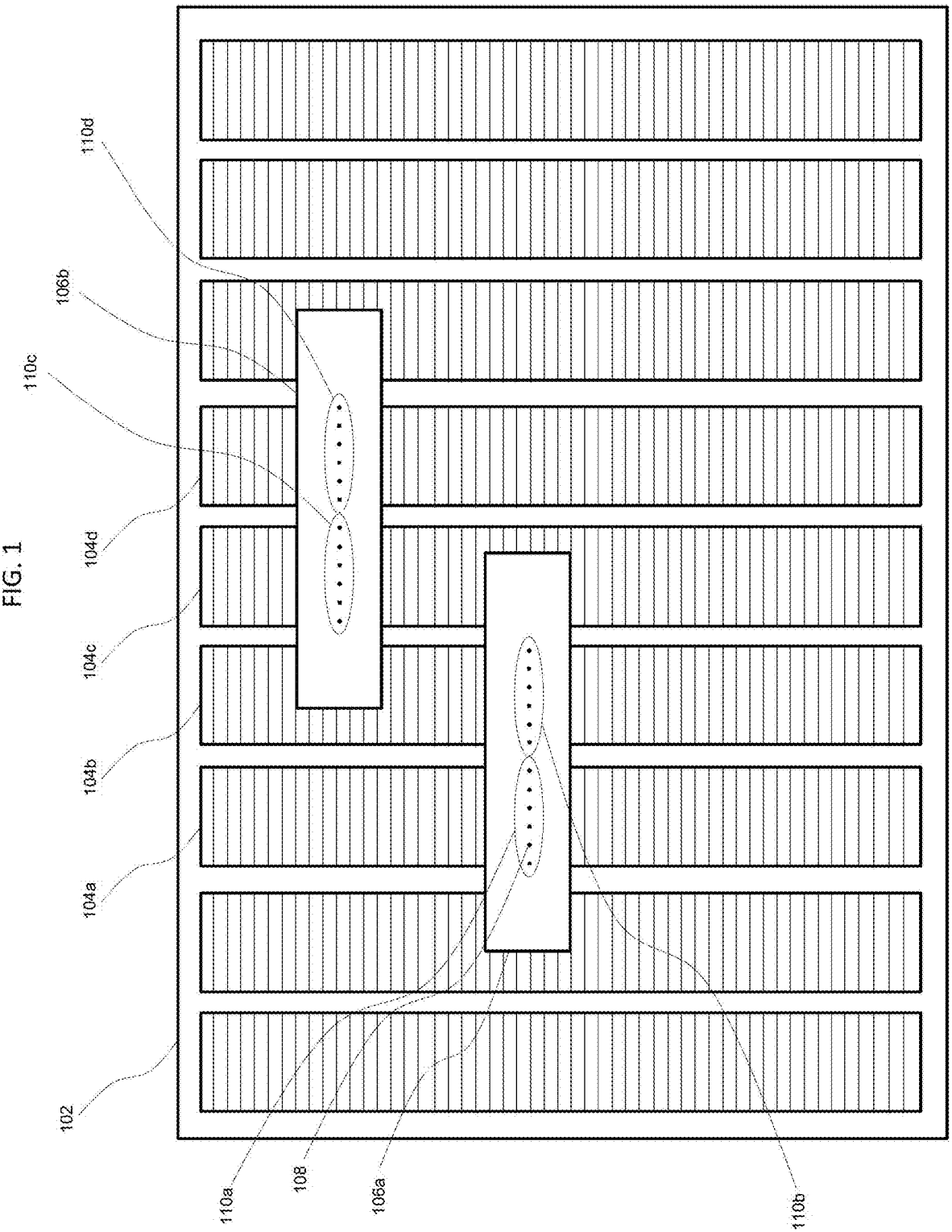
FIG. 1 shows an exemplary system for reading data from a storage medium, such as a tape.

FIG. 1 shows an exemplary system for reading data from a storage medium, such as a tape. As shown in FIG. 1, the system may include a storage medium 102 having a plurality of tracks 104a-104d, one or more heads 106a-b configured to be disposed adjacent to the tracks, and a plurality of read elements 108 which may be configured to perform readings of electromagnetic fields generated by the tracks. The read elements 108 may be arranged in a plurality of logical groups 110a-110d.

The read elements 108 may be magnetoresistive (MR). In some embodiments, heads 106a-b may be linear tape open (LTO) 3 and/or LTO-5 heads. The heads may use anisotropic MR (AMR) sensors to measure magnetic fields encoded in the storage medium, and thereby read data stored on the storage medium. The LTO-5 heads may use giant MR (GMR) sensors to measure the storage medium data. In some embodiments, the heads may use tunneling magnetoresistive (TMR) sensors. In other embodiments, a hard disk drive (HDD) read head or other head (which may include, for example, custom heads) with multiple read elements may be used.

The read elements 108 may be smaller in size when compared to the tracks 104a-d. Multiple read elements 108 may be used to capture the same storage medium data from a single track 104a-d. As described with respect to FIG. 2, by collecting multiple readings of the same track, the read elements may be used to collectively produce a composite interpretation of the data with improved accuracy. This may allow the heads to read the storage medium data without having to contact the surface of the storage medium 102. For example, the heads may be positioned adjacent to but not in contact with the storage medium 102. In some embodiments, the heads may contact the storage medium 102 with a contact force that is less a threshold force such as 200 milliNewton (mN), 100 mN, 50 mN, 20 mN, 10 mN, 5 mN, 3 mN, 1 mN, or 0.5 mN. Being able to read the storage medium data without having to make contact or only making minimal contact with the surface of the storage medium 102 may decrease the likelihood of damaging the storage medium 102. This may help preserve the integrity of the storage medium 102. Storage media such as legacy tapes are often fragile and may contain unique and irreplaceable data. Accordingly, reducing the likelihood of damage to these storage media while permitting high-fidelity readings may provide a significant technical advantage.

Multiple read elements 108 in a group may be positioned over a given track to simultaneously read storage medium data from that track. For example, the elements 108 of group 110a may be positioned to read storage medium data from track 104a, the elements of group 110b may be positioned to read storage medium data from track 104b, the elements of group 110c may be positioned to read storage medium data from track 104c, the elements of group 110d may be positioned to read storage medium data from track 104d, and so on. Although two heads 106a, 106b, each containing two groups of elements, are shown in FIG. 1, any number of heads with any number of element groups may be used to collect data from any number of tracks. For example, nine groups of elements may be disposed over a nine-track tape to read storage medium data from all nine tracks of the tape.

In some embodiments, a plurality of heads may be disposed at different positions along the storage medium. For example, a first head may be disposed to read data from a first and second track at a first position, and a second head may be disposed to read data from a second and third track at a second position that is shifted along the length of the storage medium from the first position. In some embodiments, multiple heads may be disposed at different positions along the length of the storage medium to read data from the same track(s). For example, a first head may be disposed to read data from a first and second track at a first position, and a second head may be disposed to read data from the same first and second tracks a second position that is shifted along the length of the storage medium from the first position. By using multiple heads to read data from the same tracks, additional readings may be collected, which may then be combined to produce a higher-fidelity composite interpretation of the tracks.

Additionally, any number of elements may be included in a group and positioned to read data from a given track. In some embodiments, at least two, at least three, at least four, at least five, at least six, at least eight, or at least ten read elements 108 may be used per track.

The storage medium data respectively collected by each read element 108 may be combined using techniques described herein. As described herein, combining the storage medium data may allow the read elements 108 to read the storage medium data without having to contact or with only having to apply minimal contract force to the surface of the storage medium 102. Additionally, combining the storage medium data may result in a signal associated with the storage medium data 102 that has improved fidelity, resolution, ignal-to-noise ratio (SNR), and/or the like. As described herein, the storage medium readback gathered by each read element 108 may be passed through one or more algorithms, and combined to generate a single, composite interpretation. In some embodiments, the readback from each element may be digitized before or after this processing. In some embodiments, the composite interpretation may be a composite analog signal. In other embodiments, the composite interpretation may be a composite assessment of a series of bits encoded on a track of the storage medium. A composite interpretation may be generated for one, some, or all of the tracks of the storage medium.

Interference such as adjacent track interference caused by magnetic fields from adjacent tracks may distort the readback gathered by the read elements 108 for a given track. Read elements 108 located closer to the adjacent track (e.g., near the edge of the track 104-$d$ that is being read) may be more affected by the interfering fields than read elements 108 farther from the adjacent track (e.g., closer to the center of the track 104$a$-$d$ in interest). Signal processing techniques described herein may be used to mitigate the interference.

In some embodiments, the read elements 108 may utilize a current that runs through them to read the storage medium data on the storage medium 102. Techniques such as thermoelectric cooling (TEC) may be used to control overheating of the read elements 108, thereby preventing the read elements 108 from becoming damaged.

In some embodiments, a platform may be used to position the heads 106$a$-$b$ next to the surface of the storage medium 102.

Figure 2:
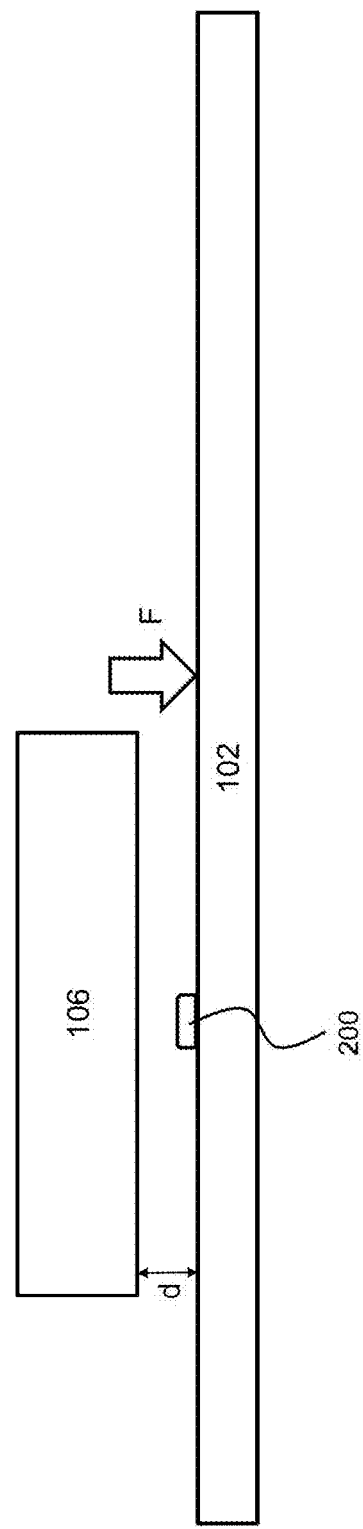
FIG. 2 shows an exemplary diagram of the distance between head and the storage medium.

FIG. 2 shows an exemplary diagram of a head 106 reading data from a storage medium 102 with no contact or minimal contact (e.g., contact force below a threshold force that risks damage to the storage medium). The surface of the storage medium 102 may have one or more debris deposits 200. Although debris can interfere with reading data from a magnetic medium, this challenge may be mitigated by using multiple reading elements and generating composite interpretations as described herein. The head 106, which may include a plurality of read elements as described above with respect to FIG. 1, may be positioned at a distal end of the tracks at a distance d from the surface of the storage medium 102. The position may be determined and/or adjusted using software techniques described herein. In some embodiments, recaptured waveforms may be used as input to a software module (or, alternatively or additionally, a hardware or firmware module which may be, for example, installed on a field programmable gate array (FPGA)), which may be linked to the system described with respect to FIG. 1. The output of the module may be a determination that the head 106 should be at a distance, d, from the surface of the storage medium 102. For example, based on the captured data, the system may be configured to adjust distance d on contact force F. For example, if the readings from individual elements disposed over a common track are inconsistent with one-another, the system may conclude that SNR is low, and that distance d should be decreased or contact force F should be increased to improve SNR. In some embodiments, this determination and adjustment may be made during a single reading pass over the length of the storage medium 102. In other embodiments, this determination may be made after a reading pass is complete, and, based on the determination, the adjustment may be made and a new pass may be initiated.

The distance d may be set to a value greater than zero. For example, distance d may be greater than 50 nanometers, 100 nanometers, 500 nanometers, 1 micron, 2 microns, 5 microns, 10 microns, 50 microns, 100 microns, 200 microns, or 500 microns. In some embodiments, the distance d may be selected based on the transition-to-transition spacing (e.g., information density) of the tape. For example, the system may be configured to obtain information relating to the transition-to-transition spacing of a tape being read, and, based on that information, adjust the distance d to move the head closer (e.g., for high density tape) or further (e.g., for lower density tape) to the tape surface. In some embodiments, the contact force F may be set to a value below a threshold that is predetermined to present an unacceptably high risk of damage to the storage medium. For example, the contact force may be below 0.01 mN, 0.02 mN, 0.05 mN, 0.1 mN, 0.2 mN, 0.5 mN, 1 mN, 2 mN, 5 mN, 10 mN, 50 mN, 100 mN, 200 mN, or 500 mN. The storage medium 102 may be advanced lengthwise by a transport (e.g., a tape transport) such that its tracks pass along the read elements of the head(s). As the storage medium 102 moves relative to the head(s) (e.g., by moving the storage medium and/or moving the head(s)), the elements may collect the raw storage medium data, which may be in the form of signals, from the storage medium 102. As described herein, a preamplifier board may be used in conjunction with the read elements to amplify and improve the SNR of the received signals. The preamplifier board may also include further amplification stages, or these further amplification stages may be on additional boards.

Figure 3:
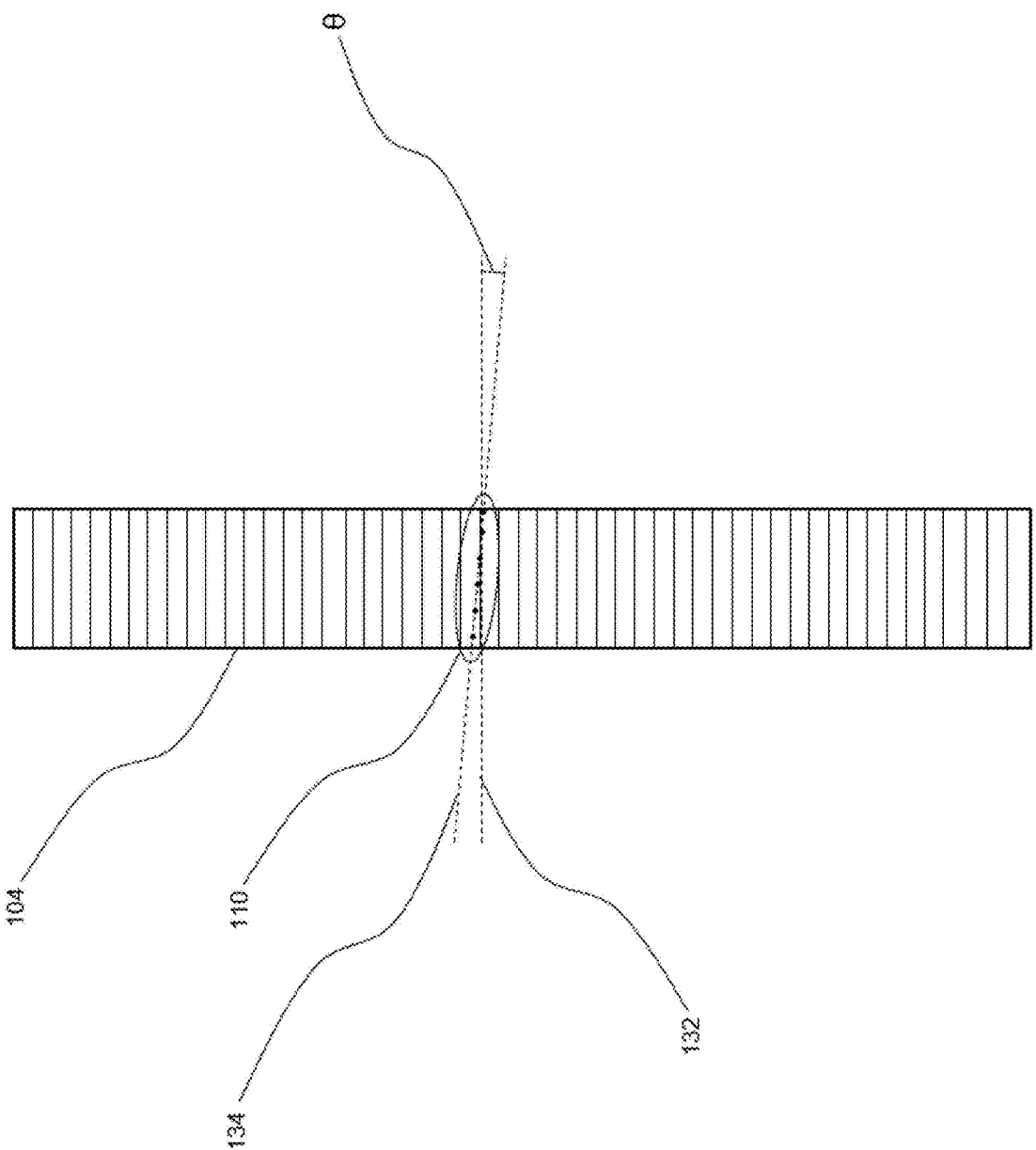
FIG. 3 shows an example of a group of sensor elements disposed at a skew angle relative to a tape.

FIG. 3 shows an exemplary group 110 of read elements positioned adjacent to a track 104 of a storage medium. A track may store a series of bits encoded along its length. Accordingly, it may generally be preferred that each of the elements in group 110 be arranged in a plane 132 that is perpendicular to the length of the track 104, such that each of the elements in group 110 read the same portion of the track (and therefore the same bits) at the same time. Well-aligned elements in the group 110 may make it simpler to synchronize the signals and data collected from each element, so that the signals and/or data may be combined to produce a more accurate composite interpretation of the track. In practice, however, the elements of a group may be arranged along a central plane 134 of head 106 that is disposed at a skew angle θ relative to plane 132. The system may analyze a waveform or bit sequence collected from each of the elements in a group 110, determine a positional or temporal shift for each element relative to the others, and based on the shift, determine a skew angle θ for the group 100 or head. Based at least in part on the determined skew angle θ, waveforms or bit sequences collected from one or more of the elements may be adjusted relative to waveforms or bit sequences collected from other of the elements to synchronize the waveforms or bit sequences for analysis. In some embodiments, the skew angle θ may change each time a head 106 is placed over a storage medium 102 and a reading is initiated. Accordingly, the skew angle θ may be calculated each time a reading is performed.

In some embodiments, there may also be minor deviations in the positioning of elements relative to plane 134. For example, due to manufacturing irregularities, one or more of the elements may be shifted such that it sits slightly to one side or the other of the plane 134 of a head 106. The system may be configured to determine these deviations by analyzing shifts between waveforms or bit sequences collected from each element, and the determined deviations may be applied to adjust collected waveforms or bit sequences and thereby assist in synchronizing the signals or data collected from each element. These deviations may be relatively stable over time. As such, the determined deviations may be measured and stored, and may then be applied across multiple readings. For example, for a given reading, a skew angle specific to that may be determined, and the determined skew angle and determined manufacturing deviations may be used to synchronize the set of readings for the elements in a group. In a second reading, a second skew angle specific to the second reading may be determined, and the determined second skew angle and the previously determined manufacturing deviations may be used to synchronize the second set of readings for the elements of the group. Readings from the elements may be processed in analog format (e.g., using filters or other signal processing) or digital format (e.g., using rules-based or machine learning software approaches). These processing approaches may generally assess the positions of the elements relative to a storage medium or track and/or conditions of the storage medium or track, and, based on these assessments, apply adjustments to the readings to improve the accuracy of a data extraction or magnetic image of the storage medium or track.

In some embodiments, the storage medium described herein may include a calibration tape customarily designed to determine the physical offset(s) of the elements and the heads from each other.

Figure 4:
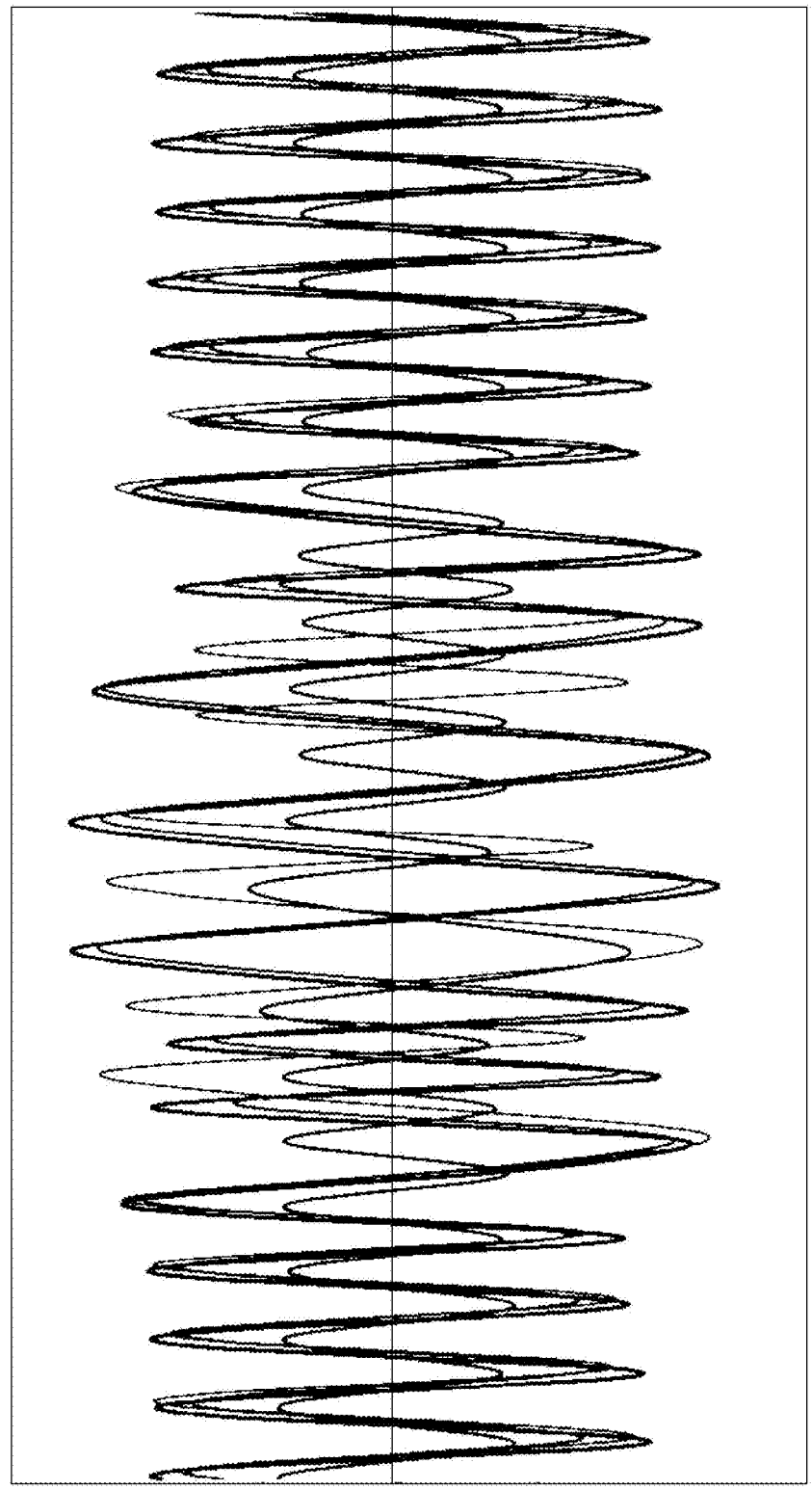
FIG. 4 shows exemplary waveforms collected by read elements of the system.
Figure 7:
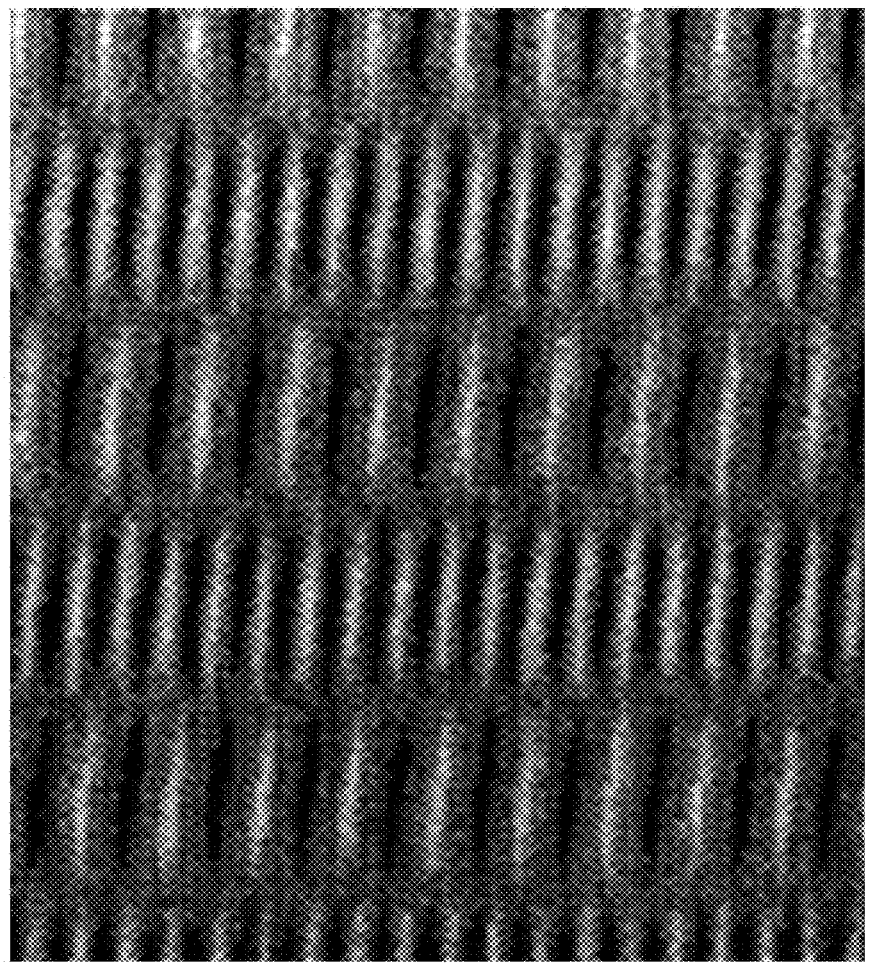
FIG. 7 shows an example of a magnetic image of a recording medium.

In some embodiments, in addition to reading the magnetically recorded data, a high-resolution magnetic image of the magnetic pattern on the material (the storage medium surface, or any other magnetic surface) may be obtained. FIG. 7 shows an example of a magnetic image of a recording medium. The magnetic image may be analyzed by the system (or an external analysis tool) regardless of the data pattern. Properties about the medium may be determined. In some embodiments, an age, magnetic condition, damage, debris, and/or other conditions of the storage may be assessed based on the analysis. FIG. 4 shows exemplary waveforms collected by read elements of the system. Analysis may be performed on the storage medium data (e.g., the multiple captured readbacks of the same portion of the storage medium) captured by the read elements. The analysis may be performed by a module linked to the system, which may include one or more algorithms. Information indicative of the storage medium data may be used as inputs to the algorithms. The output of the algorithm(s) may involve a determination of how to combine the readbacks, which may be described with respect to FIG. 1. In some embodiments, the module may compare the readbacks from each of the read elements and determine that one of the readbacks does not match the others. In such a case, the outlier readback may be excluded from being combined with the others. In some embodiments, a deviation value, such as a variance, between the readbacks may be calculated. The deviation value may be compared to a failure threshold, which may be used to determine if the readback, or a portion thereof, is too erroneous to undergo error correction. If the deviation value is below the failure threshold, the module of the system may execute error correction protocol on the erroneous readback, for example, to remove anomalies. After the protocol is executed, the readback may be re-evaluated to determine if it can be combined with the other readbacks.

The analysis described herein may involve determining which combination techniques to use when combining the readbacks from the multiple read elements. The readbacks may be combined using combination techniques which include one or more of the following: summing, amplitude modulating, averaging, multiplexing, and/or the like. The readbacks may be aligned, for example, prior to combining them. The result of the combination may be a high-fidelity composite interpretation (e.g., composite readback) associated with the track. Using the composite interpretation instead of an individual readback, the store medium data may be more accurately determined.

Combining the readbacks of the read elements may optionally include oversampling waveforms associated with each of the readbacks. In some embodiments, the waveforms may be synchronized. For example, a cross-correlation may be performed between the waveforms. In some embodiments, the waveforms or bit sequences may be shifted relative to one-another to maximize a cross-correlation of the waveforms or bit sequences. In some embodiments, the synchronization may involve matching a timestamp associated with a set of waveforms associated with a first readback with a timestamp associated with a set of waveforms associated with a second readback. For example, the storage medium may have a plurality of timestamps or indicators for where a sequence of bits begins or ends. The system may identify these timestamps or indicators and shift the waveforms or bit sequences collected by the elements of a group such that the timestamps or indicators are synchronized. After the readbacks are synchronized, one or more of the techniques described herein may be applied to generate a composite readback. In some embodiments, the system may critically sample (e.g., 1 sample per bit) the readback waveform. For example, a phase-locked loop may be used to control precise sampling and ensure that the timing of the sampling is aligned with bit periods on the medium. Each of the signal processing, alignment, averaging, and detection processes described herein may be applied to critically sampled embodiments.

In some embodiments, a composite interpretation of a track may produce at least in part by combining the readings or data collected from a plurality of elements of a group on a head. In some embodiments, the waveforms may be synchronized and then a simple average may be taken to generate a composite waveform. In other embodiments, other techniques may be applied. By using multiple readings, the composite interpretation may have an improved SNR and/or higher fidelity than a single reading would have produced. The improved SNR may be attributed to noise associated with the readbacks being nullified upon combination due to it being less correlated on average than the readback signals. For example, by averaging the readbacks, uncorrelated noise may be diminished, while the correlated data signal may be preserved.

The read sensor may include and/or be linked to logic that digitizes the waveforms associated with the readbacks from each of the read elements. The digitization of the waveforms may occur before or after the combination described herein. The digitized waveform may be used to determine the bits (0s and 1) of the storage medium data. The digitized waveform may be used to analyze other properties of the magnetic medium or the condition of its surface or substrate (e.g., mylar (or other material) tape). The digitized waveform may be used to create a precise magnetic image of the magnetic surface to secure a version of the magnetization that can be analyzed at a later time. This may provide a precise record of the magnetic pattern on the surface at a point in time. This can be used as a way to preserve not just the data, but the magnetic state itself.

The readbacks from the read elements may be encoded. In such a case, in order to obtain the storage medium data, logic of the system, for example, logic linked to the read sensor, may have to decode the storage medium data, which may involve performing one or more of the following operations: run-length limited (RLL), cyclic redundancy check (CRC), and/or error correction codes (ECCs). In some embodiments, before these procedures, stored (encoded) bits may be detected. This may include the steps of automatic gain control (AGC), timing extraction via phase-locked loop (PLL), filtering and equalization, adaptive filtering, channel identification, and/or detection.

As described with respect to FIG. 1, the track(s) may indicate the storage medium data. In some embodiments, the system may include at least nine tracks. In some embodiments, the storage medium, which may be a tape, may be at least 0.5 inches in width. The read elements may be modularized and may be able to cover other storage medium widths such as approximately 0.125 inches, 0.25 inches and/or 1 inch or 2 inches. The techniques described herein may apply to a variety of storage medium formats such as 3480, 3490, QIC and/or digital audio tape (DAT). The read sensor and/or read elements may be adjusted to accommodate the different waveforms and data formats associated with each storage medium format. The techniques described herein may apply to analog recordings such as audio, video, and/or recordings from scientific instruments.

The data associated with the composite interpretation (e.g., data combined from the raw readbacks) may be formatted to integrate with file reconstruction and/or data migration tools. The data associated the composite interpretation may be formatted to be compatible with third-party marketplaces.

A preamplifier board may be included in the system. The preamplifier board may increase the signal generated from the read elements. The board may be customized to accommodate AMR, GMR, and/or TMR heads, or other magnetic sensors. In some embodiments, the board may include at least four channels. The preamplifier board may be used to prevent the read elements from being saturated by the magnetic particles of the storage medium (e.g., these particles are often larger in legacy tapes than modern tapes).

Using multiple read elements to determine a composite interpretation may also assist in obtaining data from damage to a storage medium. Such damage may be present where a storage medium has been creased, partially demagnetized, heated, stretched, punctured, corroded, accumulated debris, or otherwise deformed. Damaged storage medium may be more likely to produce damaged signals that read elements are unable to process. In some embodiments, multi-element composite interpretations of a track or storage medium may be used to assess damage to the storage medium or track. For example, portions of a waveform associated with low amplitude indicate damage to the storage medium at the corresponding portion of the storage medium.

Types of damage may be identified and categorized using damage signatures, for example, due to certain damage predictably generating a particular waveform. The signatures along with the error mitigation measure (e.g., the combination technique) may be indexed and called for processing future storage medium data. For example, the system may be configured to assess a type of damage at a portion of a storage medium and apply signal or data processing logic that is specific to that type of damage.

Figure 5:
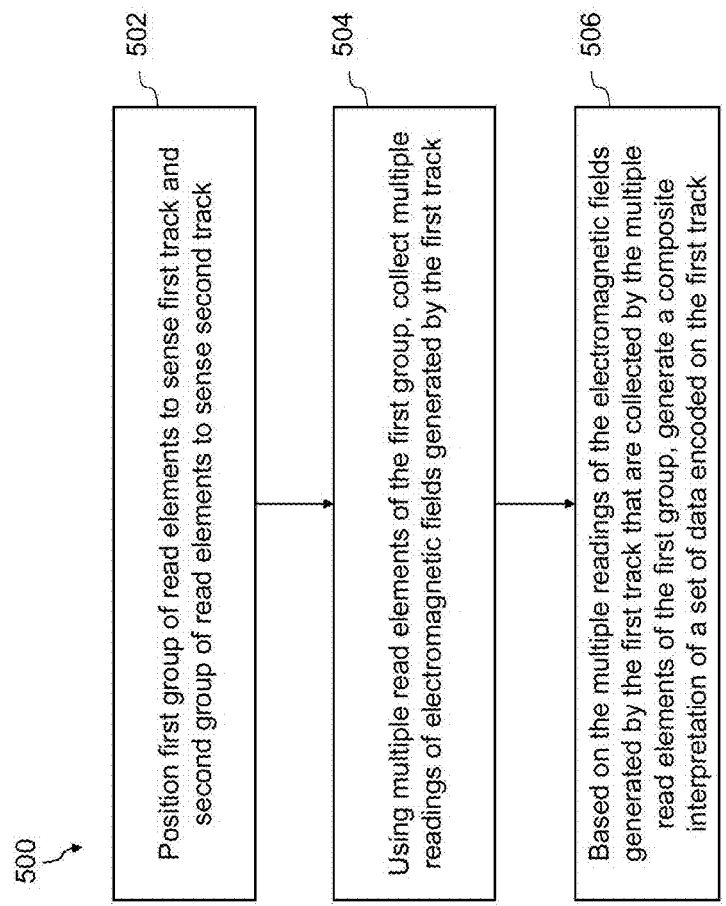
FIG. 5 shows an exemplary method for generating a composite reading of a magnetic medium.

FIG. 5 shows an exemplary method 500 for retrieving information stored on a storage medium. Method 500 may be performed using the systems described above with respect to FIGS. 1-4. In some embodiments, the system may include one or more heads, which may include a plurality of read elements configured to detect electromagnetic fields produced by one or more tracks of a storage medium. The plurality of read elements may include a first group of read elements and a second group of read elements. The electromagnetic fields may indicate information stored on the storage medium. In some embodiments, the read sensor(s) may be configured such that the first group of read elements and the second group of read elements can simultaneously read the first and second sets of data from the first and second tracks. In some embodiments, the elements may be configured to perform readings without contacting the storage medium or while applying a contact force that is less than a threshold value. In some embodiments, the threshold value may be 1 mN.

At step 502, the first group of read elements may be positioned adjacent to the first track and the second group of read element may be adjacent to the second track. In some embodiments, the system may include a second read sensor. The second read sensor may include at least two groups of read elements respectively positioned adjacent to third and fourth tracks of the storage medium. The first read sensor and the second read sensor may be positionally staggered to read data from the storage medium at different positions along the length of the storage medium. The plurality of read elements may be disposed on an LTO tape head. The tape head may be retrofitted to a legacy tape reader. For example, a user may have an existing tape reader (which may, in some cases, have been used for many years). To improve the performance of the existing tape reader and reduce damage to storage medium, a head with multiple read elements per track may be retrofitted to the existing tape reader, and software having the functionalities described herein may be installed to extract data and/or create magnetic images with higher accuracy and less damage to recording media.

At 504, multiple readings of the electromagnetic fields generated by the first track may be collected using multiple read elements of the first group. In some embodiments, multiple readings of the electromagnetic fields generated by the first track may be collected using multiple read elements of the second group.

At 506, a composite interpretation of a set of data encoded on the first track may be generated based on the multiple readings of the electromagnetic fields generated by the first track that are collected by the multiple read elements of the first group. In some embodiments, a composite interpretation of a set of data encoded on the first track may be generated based on the multiple readings of the electromagnetic fields generated by the first track that are collected by the multiple read elements of the second group. The composite interpretation of the first set of data of the first track may be generated by combining the first reading of the electromagnetic fields from the first track and the second reading of the electromagnetic fields from the first track. Combining the first reading of the electromagnetic fields from the first track and the second reading of the electromagnetic fields from the first track may include one or more of the following: oversampling a first set of waveforms associated with the first reading of the electromagnetic fields from the first track and a second set of waveforms associated with the second reading of the electromagnetic fields from the first track, synchronizing the first set of waveforms and the second set of waveforms, or applying at least one of summing, amplitude modulating, averaging, or multiplexing.

In some embodiments, the first reading of the electromagnetic fields from the first track may be aligned, using a first synchronization mark, with the second reading of the electromagnetic fields from the first track. Aligning the first reading of the electromagnetic fields from the first track with the second reading of the electromagnetic fields from the first track may include matching a timestamp associated with the first reading of the electromagnetic fields from the first track with a timestamp associated with second reading of the electromagnetic fields from the second track. Aligning the first reading of the electromagnetic fields from the first track with the second reading of the electromagnetic fields from the first track may include cross-correlating signals associated with the first reading of the electromagnetic fields from the first track with signals associated with the second reading of the electromagnetic fields from the first track.

In some embodiments, the composite interpretation of the first set of data of the first track may be generated by averaging the first reading of the electromagnetic fields from the first track and the second reading of the electromagnetic fields from the first track. Averaging the first reading of the electromagnetic fields from the first track and the second reading of the electromagnetic fields from the first track may improve a signal-to-noise ratio (SNR) of the composite interpretation at least in part by diminishing uncorrelated noise.

In some embodiments, a skew may be determined between the first group of read elements and the first track. Using the determined skew, the first reading of the first track may be aligned with the second reading on the first track.

In some embodiments, data collected by the system may be transmitted to storage may be used to archive data that may be used in the future. Storage may be linked to off-desk and/or offline memory. The storage may include fast solid-state storage such as solid-state drives (SSDs).

The analytics module of the read sensor may access algorithms. The algorithms may be able to detect problems such as interference with a read element readback or the composite readback. The algorithm additionally may be able to identify a cause of the problem such as the tape's age, degradation, damage, and/or the like. Upon detection, the read sensor may activate a mitigation algorithm designed to mitigate the effects of the problem. The algorithms may be used to enhance the resolution and/or fidelity of the composite readback signal. A decoding algorithm may be used to recover the actual data from the encoded composite readback. The decoding algorithm may be adjusted based on the density of the readback signal. For example, one or more parameters associated with the algorithm may be updated to accommodate signals with higher densities such as 9042 flux changes per inch.

A robotic system, such as a robotic slide, may be communicatively coupled to the head. The robotic system may be used to shift the reading sensor to an adjacent physical track after the reading sensor has completed reading the signals from a current physical track. After shifting to the adjacent physical track, the reading sensor may then begin reading the track. This sequence may repeat until all physical tracks of the tape have been read. An indication may be sent to the robotic system to signal that the reading sensor has completed the readings for the current track.

Figure 6:
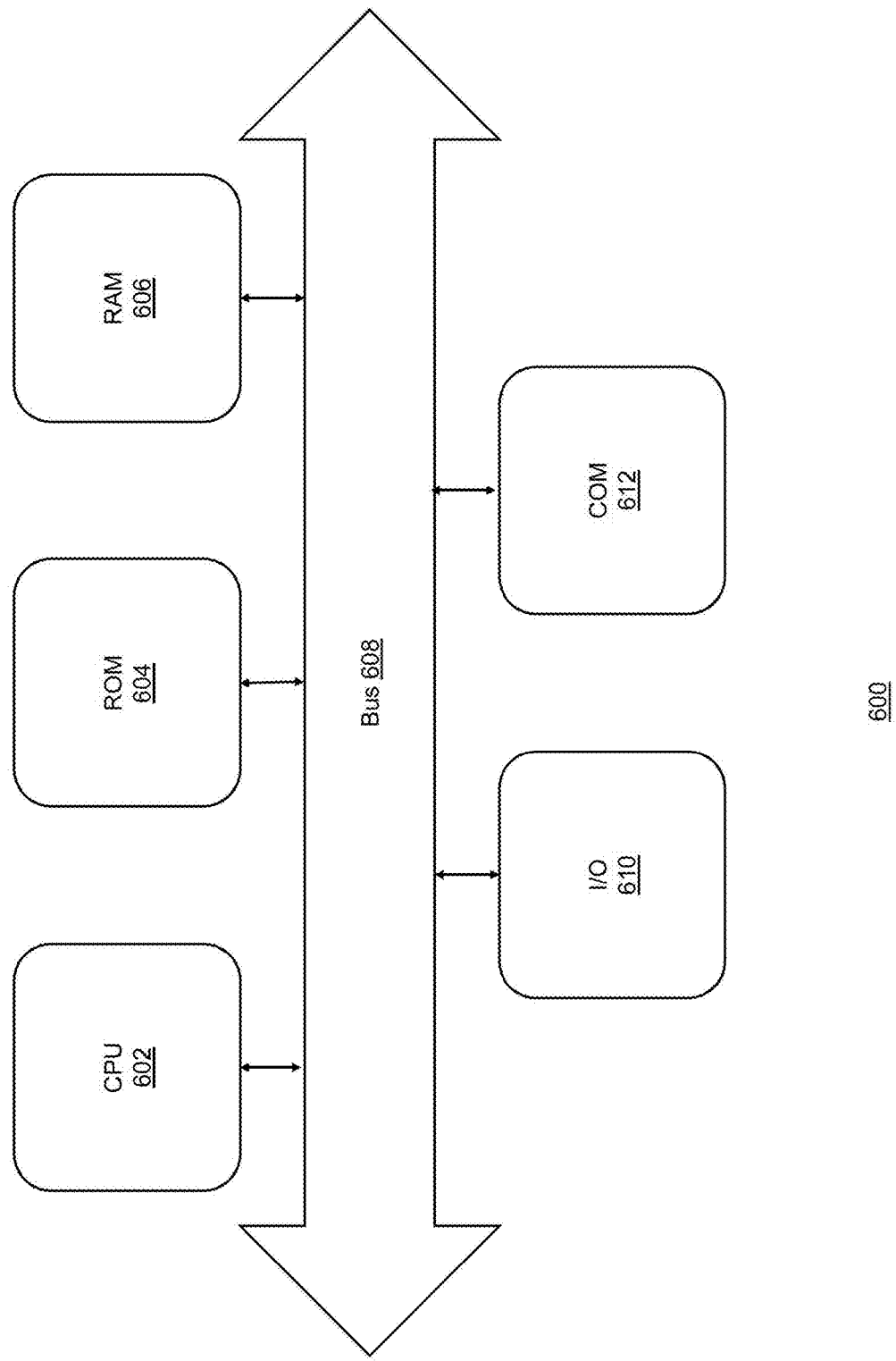
FIG. 6 shows an exemplary processing system that may execute techniques presented herein.

FIG. 6 depicts an example system that may execute techniques presented herein. FIG. 6 is a simplified functional block diagram of a computer that may be configured to execute techniques described herein, according to exemplary cases of the present disclosure. Specifically, the computer (or "platform" as it may not be a single physical computer infrastructure) may include a data communication interface 612 for packet data communication. The platform may also include a central processing unit ("CPU") 602, in the form of one or more processors, for executing program instructions. The platform may include an internal communication bus 608, and the platform may also include a program storage and/or a data storage for various data files to be processed and/or communicated by the platform such as ROM 604 and RAM 606, although the system 600 may receive programming and data via network communications. The system 600 also may include input and output ports 610 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices, wearable devices, all manner of cellular or mobile phones, media players, virtual reality devices, multi-processor systems, microprocessor-based or programmable consumer electronics, network PCs, microprocessors, application specific integrated circuits (ASICs), mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for retrieving information stored on a storage medium, the system comprising:

a read sensor comprising a plurality of read elements configured to detect electromagnetic fields produced by one or more tracks of a storage medium, wherein the electromagnetic fields indicate information stored on the storage medium; and one or more processors configured to execute a plurality of computer-executable instructions;

wherein the system is configured to:

sense a first track of the storage medium using the plurality of read elements;

obtain, using a first read element of the plurality of read elements, a first reading of electromagnetic fields from the first track;

obtain, using a second read element of the plurality of read elements, a second reading of the electromagnetic fields from the first track;

generate a composite interpretation based on both the first reading of the electromagnetic fields from the first track obtained using the first read element and the second reading of the electromagnetic fields from the first track obtained using the second read element; and determine whether a portion of the first track is damaged based on the composite interpretation.

2. The system of claim 1, wherein the system is further configured to:

generate a digitized waveform based on the composite interpretation; and analyze the digitized waveform to determine whether the portion of the first track is damaged.

3. The system of claim 2, wherein the system is further configured to identify a type of damage to the portion of the first track based on a damage signature.

4. The system of claim 3, wherein the system is further configured to execute one or more mitigation algorithms to enhance a resolution and/or fidelity of the digitized waveform based on the type of damage to the portion of the first track.

5. The system of claim 1, wherein the system is further configured to:

apply preamplification to the first reading of the electromagnetic fields from the first track and the second reading of the electromagnetic fields from the first track, wherein applying the preamplification improves a fidelity of the first reading of the electromagnetic fields from the first track and a fidelity of the second reading of the electromagnetic fields from the first track.

6. The system of claim 1, wherein the composite interpretation of the first track is generated by performing at least one of the following steps:

oversampling a first set of waveforms associated with the first reading of the electromagnetic fields from the first track and a second set of waveforms associated with the second reading of the electromagnetic fields from the first track;

synchronizing the first set of waveforms and the second set of waveforms; and applying at least one of summing, amplitude modulating, averaging, and multiplexing operations.

7. The system of claim 1, wherein:

the composite interpretation of the first track is generated by averaging the first reading of the electromagnetic fields from the first track and the second reading of the electromagnetic fields from the first track, wherein the averaging improves a signal-to-noise ratio of the composite interpretation at least in part by diminishing uncorrelated noise.

8. The system of claim 1, wherein the read sensor is configured such that the first read element and the second read element can simultaneously read the electromagnetic fields from the first track without contacting a surface of the storage medium.

9. The system of claim 1, wherein the read sensor is configured such that the first read element and the second read element can simultaneously read the electromagnetic fields from the first track while applying a contact force to a surface of the storage medium that is less than 100 millinewtons.

10. The system of claim 1, further comprising a linear tape open (LTO) tape head, wherein the LTO tape head comprises the read sensor.

11. A method for retrieving information stored on a storage medium, the method comprising:
 positioning a read sensor adjacent to a first track of one or more tracks of the storage medium, wherein the read sensor comprises a plurality of read elements configured to detect electromagnetic fields produced by the one or more tracks of the storage medium, and wherein the electromagnetic fields indicate information stored on the storage medium;
 obtaining, using a first read element of the plurality of read elements, a first reading of electromagnetic fields from the first track;
 obtaining, using a second read element of the plurality of read elements, a second reading of the electromagnetic fields from the first track;
 generating a composite interpretation based on both the first reading of the electromagnetic fields from the first track obtained using the first read element and the second reading of the electromagnetic fields from the first track obtained using the second read element; and
 determining whether a portion of the first track is damaged based on the composite interpretation.

12. The method of claim 11, wherein the method further comprises:
 generating a digitized waveform based on the composite interpretation; and
 analyzing the digitized waveform to determine whether the portion of the first track is damaged.

13. The method of claim 12, wherein the method further comprises identifying a type of damage to the portion of the first track based on a damage signature.

14. The method of claim 13, wherein the method further comprises executing one or more mitigation algorithms to enhance a resolution and/or fidelity of the digitized waveform based on the type of damage to the portion of the first track.

15. The method of claim 11, wherein the method further comprises applying preamplification to the first reading of the electromagnetic fields from the first track and the second reading of the electromagnetic fields from the first track, wherein applying the preamplification improves a fidelity of the first reading of the electromagnetic fields from the first track and a fidelity of the second reading of the electromagnetic fields from the first track.

16. The method of claim 11, wherein generating the composite interpretation comprises at least one of the following steps:
 oversampling a first set of waveforms associated with the first reading of the electromagnetic fields from the first track and a second set of waveforms associated with the second reading of the electromagnetic fields from the first track;
 synchronizing the first set of waveforms and the second set of waveforms; and
 applying at least one of summing, amplitude modulating, averaging, and multiplexing operations.

17. The method of claim 11, wherein generating the composite interpretation comprises averaging the first reading of the electromagnetic fields from the first track and the second reading of the electromagnetic fields from the first track, wherein the averaging improves a signal-to-noise ratio of the composite interpretation at least in part by diminishing uncorrelated noise.

18. The method of claim 11, wherein the steps of obtaining the first reading of electromagnetic fields from the first track and obtaining the second reading of electromagnetic fields from the first track are performed simultaneously; and wherein the read sensor does not contact a surface of the storage medium.

19. The method of claim 11, wherein the steps of obtaining the first reading of electromagnetic fields from the first track and obtaining the second reading of electromagnetic fields from the first track are performed simultaneously; and wherein the read sensor applies a contact force to a surface of the storage medium that is less than 100 millinewtons.

20. The method of claim 11, wherein the method further comprises retrofitting a linear tape open (LTO) tape head to a tape reader; and wherein the LTO tape head comprises the read sensor.

* * * * *